US009046740B1

(12) United States Patent
Smithweck

(10) Patent No.: US 9,046,740 B1
(45) Date of Patent: Jun. 2, 2015

(54) PHOTOGRAPHY STUDIO WITH REVOLVABLE CURVED WALL DEFINING STUDIO BACKDROP AND WALL OPENING

(71) Applicant: Jay Smithweck, Odessa, FL (US)

(72) Inventor: Jay Smithweck, Odessa, FL (US)

(73) Assignee: 360 BOOTH, INC., Odessa, FL (US)

( * ) Notice: Subject to any disclaimer, the term of this patent is extended or adjusted under 35 U.S.C. 154(b) by 0 days.

(21) Appl. No.: 14/457,496

(22) Filed: Aug. 12, 2014

(51) Int. Cl.
*G03B 15/00* (2006.01)

(52) U.S. Cl.
CPC .................................... *G03B 15/00* (2013.01)

(58) Field of Classification Search
USPC ........................................................ 396/1–5
See application file for complete search history.

(56) References Cited

U.S. PATENT DOCUMENTS 4,545,630 A * 10/1985 Izumi et al. .................. 312/285
4,928,429 A 5/1990 Colombo
5,452,547 A 9/1995 Baloga et al.
5,653,063 A 8/1997 Barnett et al.
6,375,562 B1 4/2002 Hein
6,412,220 B1 7/2002 Lindley

FOREIGN PATENT DOCUMENTS

WO 2005052298 A1 9/2005

* cited by examiner

*Primary Examiner* — W B Perkey
*Assistant Examiner* — Minh Phan
(74) *Attorney, Agent, or Firm* — Gold & Rizvi, P.A.; Glenn E. Gold

(57) ABSTRACT

A photography studio includes a stationary circular track surrounding a product setup location, such as a stationary circular platform, an upright curved wall defining a studio backdrop and at least partially surround the platform, a front curved overhead member mounted across a side opening in the wall, and a plurality of spaced apart rollers rotatably mounted on a lower end portion of the wall and engaged with the track so as to mount the wall upon the track for undergoing revolvable movement along the track and about the platform to relocate the side opening of the wall at any selected angular position in relation to the platform. The upright curved wall includes a plurality of curved panels assembled to one another side-to-side and top-to-bottom so as to provide the studio backdrop.

18 Claims, 10 Drawing Sheets

106
118
114
120
126
122
116

132
128
130
132
128
130

136
130
138
138
134
134
134
136
138
132
138
128
132

PHOTOGRAPHY STUDIO WITH REVOLVABLE CURVED WALL DEFINING STUDIO BACKDROP AND WALL OPENING

FIELD OF THE INVENTION

The present invention relates to setups for photographing products and, more particularly, is concerned with a photography studio with a revolvable curved wall defining a studio backdrop and a wall opening.

BACKGROUND OF THE INVENTION

Advertising of consumer products, such as automobiles, typically employs numerous photographs or pictures thereof. In cases where a stationary setup of advertising and logo display partitions and photographic equipment is used in taking the photographs, the automobile will oftentimes need to be relocated numerous times relative to the stationary setup in order to enable taking photographs from different angles with respect to the automobile.

One approach to relocating the automobile each time relative to the stationary setup is to drive the automobile back and forth so as to maneuver it into a position that places the automobile at the desired angle relative to the stationary setup. However, adopting this approach can turn out to be a time-consuming process, adding significantly to overall costs.

Another approach to relocating the automobile each time relative to the stationary setup is to initially position the automobile upon a rotatable turntable adjacent to the stationary setup. The turntable must then be operated to relocate the automobile each time to an new position relative to the stationary setup. However, adopting this approach, because of the employment of a rotatable turntable on which to mount the automobile, can likewise add significantly to overall costs.

Accordingly, there remains a need in the art for an innovation that will overcome the deficiencies of these past approaches and the problems that remain unsolved.

SUMMARY OF THE INVENTION

The present invention provides an innovation in the form of a photography studio that overcomes the deficiencies of the past approaches and the problems that remain unsolved relating to taking photographs of products from many different angles. The photography studio provides a revolvable curved wall defining a studio backdrop and an opening providing an entrance and access to a product setup location and space for photography equipment setup. Thus, instead of moving the product into different setup positions, the setup position of the studio itself is transformable, thereby enabling the product to remain stationary, in order to view and thus photograph it from many different angles.

In one aspect of the present invention, a photography studio includes:

- a stationary circular track surrounding a product setup location;
- an upright wall defining a studio backdrop, being of a curved configuration, at least partially surrounding the product setup location, and being mounted at a lower end portion of the wall by the track for undergoing revolvable movement along the track and about the product setup location, the wall having a pair of upright edge portions being spaced apart so as to define a side opening in the wall providing an entrance to the product setup location; and
- a front overhead member, being of a curved configuration similar to that of the wall and extending between and mounted on the spaced apart upright edge portions of the wall at an upper end portion of the wall, for undergoing the revolvable movement with the wall.

In another aspect of the present invention, the upright curved wall includes a plurality of curved vertical sections in a side-by-side alignment with one another.

In another aspect of the present invention, each of the curved vertical sections of the upright curved wall includes a pair of curved panels in a top-to-bottom alignment with one another.

In another aspect of the present invention, the front curved overhead member includes a pair of curved components aligned end-to-end with one another, with each curved component including a curved frame and a curved cover sheet disposed on an interior side of and being assembled to the curved frame.

In another aspect of the present invention, a photography studio includes:

- a stationary circular platform providing a product setup location;
- a stationary circular track surrounding the platform; and
- an upright wall defining a studio backdrop, being of a curved configuration, and at least partially surrounding the platform, the wall having a pair of upright edge portions being spaced apart so as to define a side opening in the wall providing an entrance to the platform;
- wherein the upright wall also has a plurality of rollers being spaced apart from one another and rotatably mounted on a lower end portion of the wall and engaged with the track so as to mount the wall upon the track for undergoing revolvable movement along the track and about the platform to relocate the wall and thus the side opening of the wall at any selected angular position in relation to the platform.

In a further aspect of the present invention, a photography studio includes:

- a stationary circular track surrounding a product setup location; and
- an upright wall defining a studio backdrop and providing a side opening for setup of equipment for photographing a product at the product setup location, the wall being of a curved configuration, at least partially surrounding the product setup location, and mounted at a lower end portion of the wall by the track for undergoing revolvable movement along the track and about the product setup location;
- wherein the upright curved wall includes a plurality of curved panels assembled to one another side-to-side and top-to-bottom so as to provide said studio backdrop, each of said curved panels being comprised of
  - a curved lattice frame, and
  - a curved cover sheet disposed on an interior side of and being assembled to the curved lattice frame.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
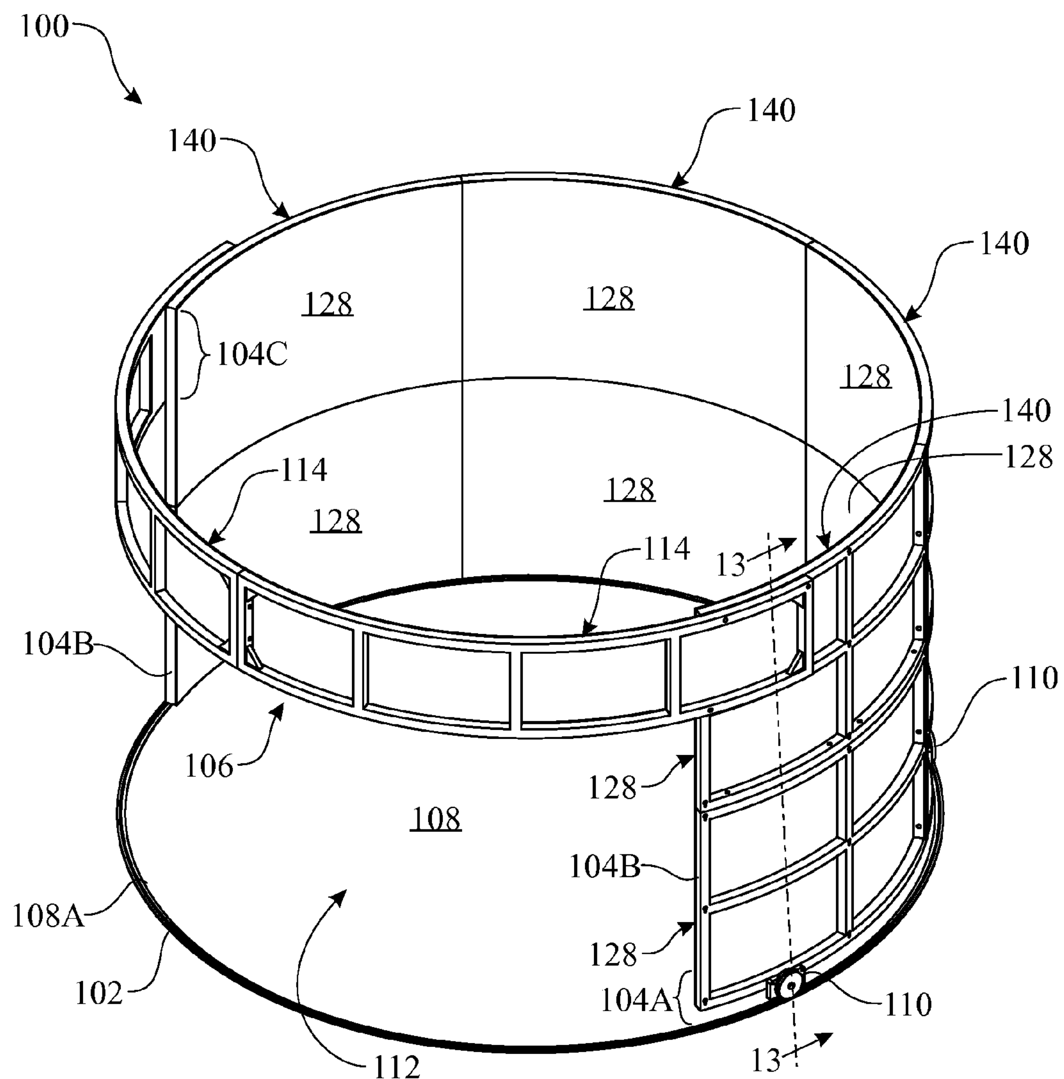
FIG. 1 presents a top front isometric view of an exemplary embodiment of a photography studio in accordance with the present invention.
Figure 2:
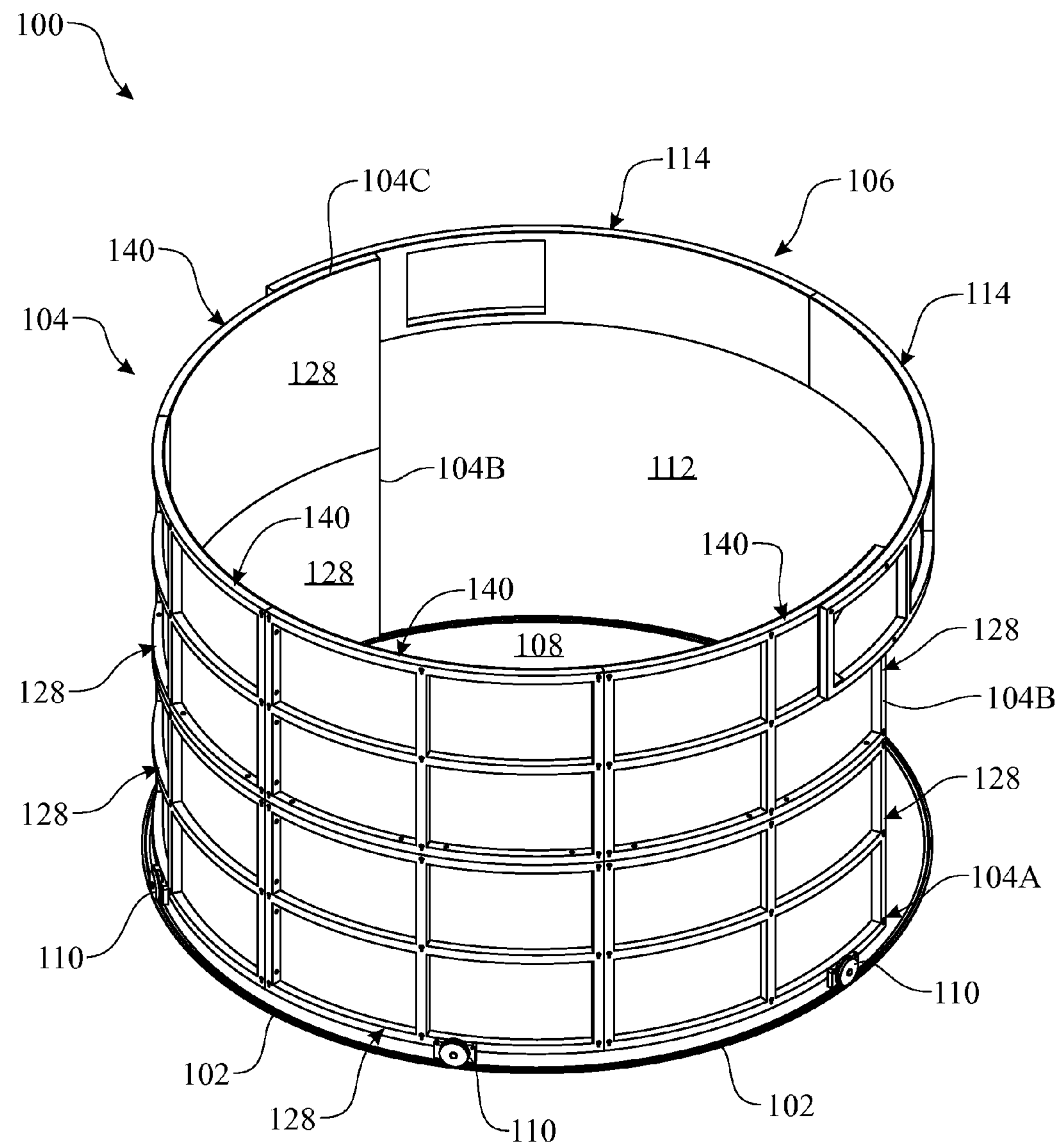
FIG. 2 presents a top rear isometric view of the studio originally introduced in FIG. 1.
Figure 3:
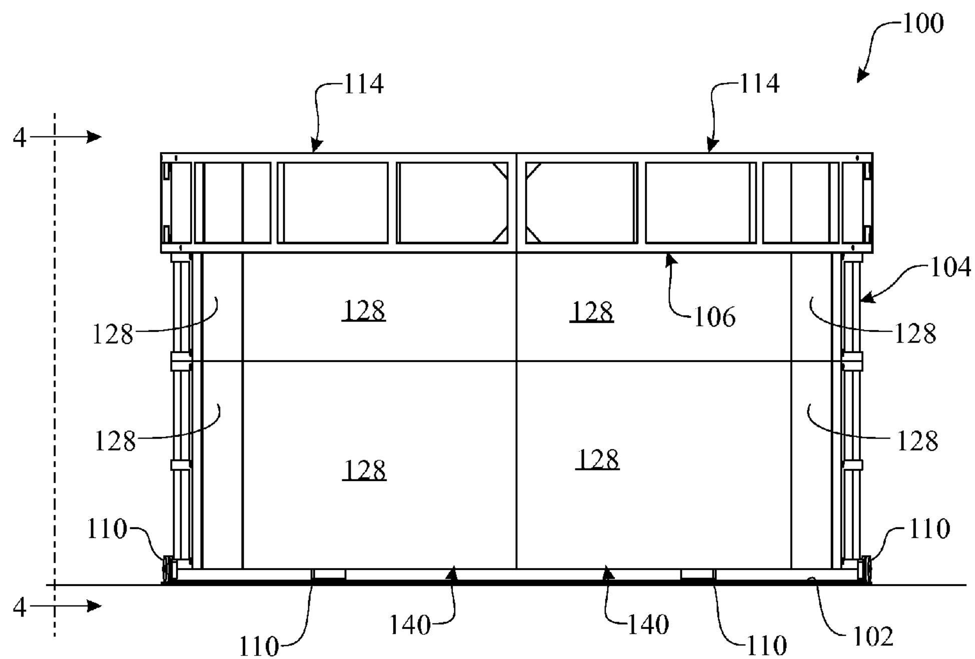
FIG. 3 presents a front elevational view of the studio originally introduced in FIG. 1.
Figure 4:
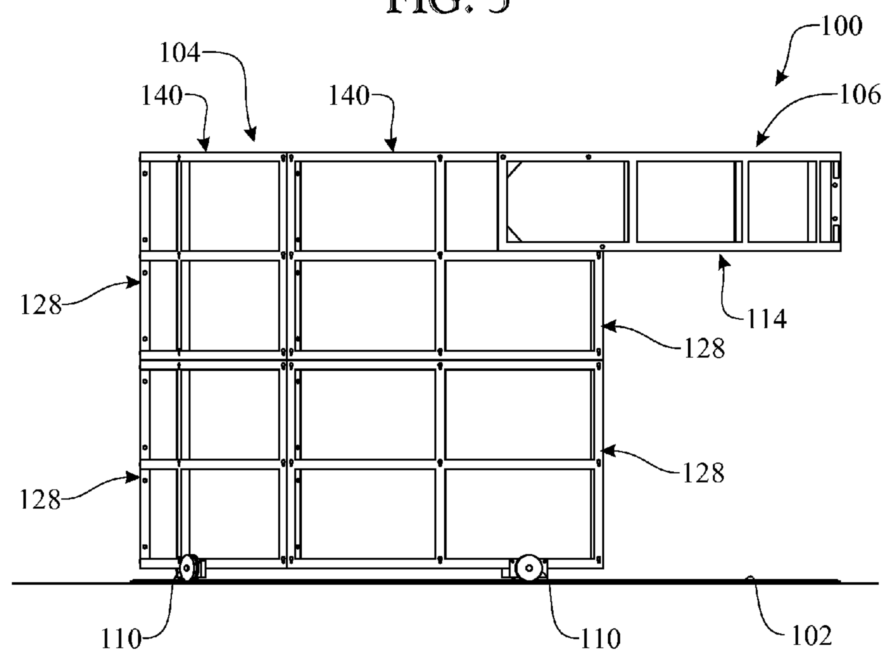
FIG. 4 presents a side elevational view of the studio taken along line 4-4 in FIG. 3.
Figure 5:
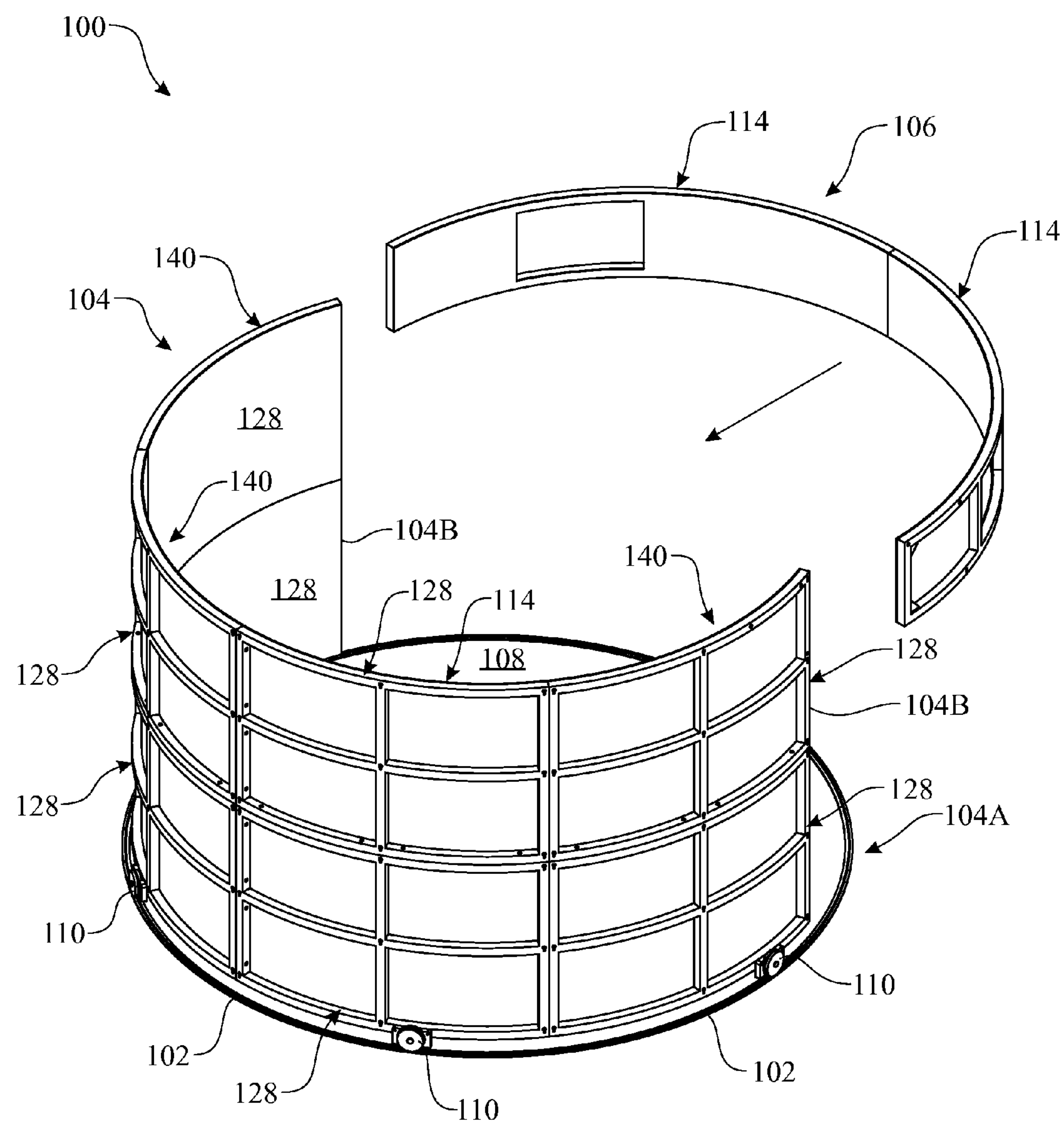
FIG. 5 presents a top rear isometric view of the studio similar to that of FIG. 2 but showing a front curved overhead member disassembled from an upright curved wall of the studio.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-5 and 13-15, there is illustrated a photography studio, generally designated 100, in accordance with the present invention. The photography studio 100 basically includes a stationary track 102, an upright wall 104, and a front overhead member 106. Also, the studio 100 preferably includes a stationary flat platform 108 providing a product setup location within the studio. Further, a plurality of rollers 110 are provided, being spaced apart from one another and rotatably mounted on a lower end portion 104A of the wall 104 and engaged with the track 102 so as to mount the wall 104 upon the track 102 for undergoing revolvable movement along the track 102 and about the platform 108.

Figure 13:
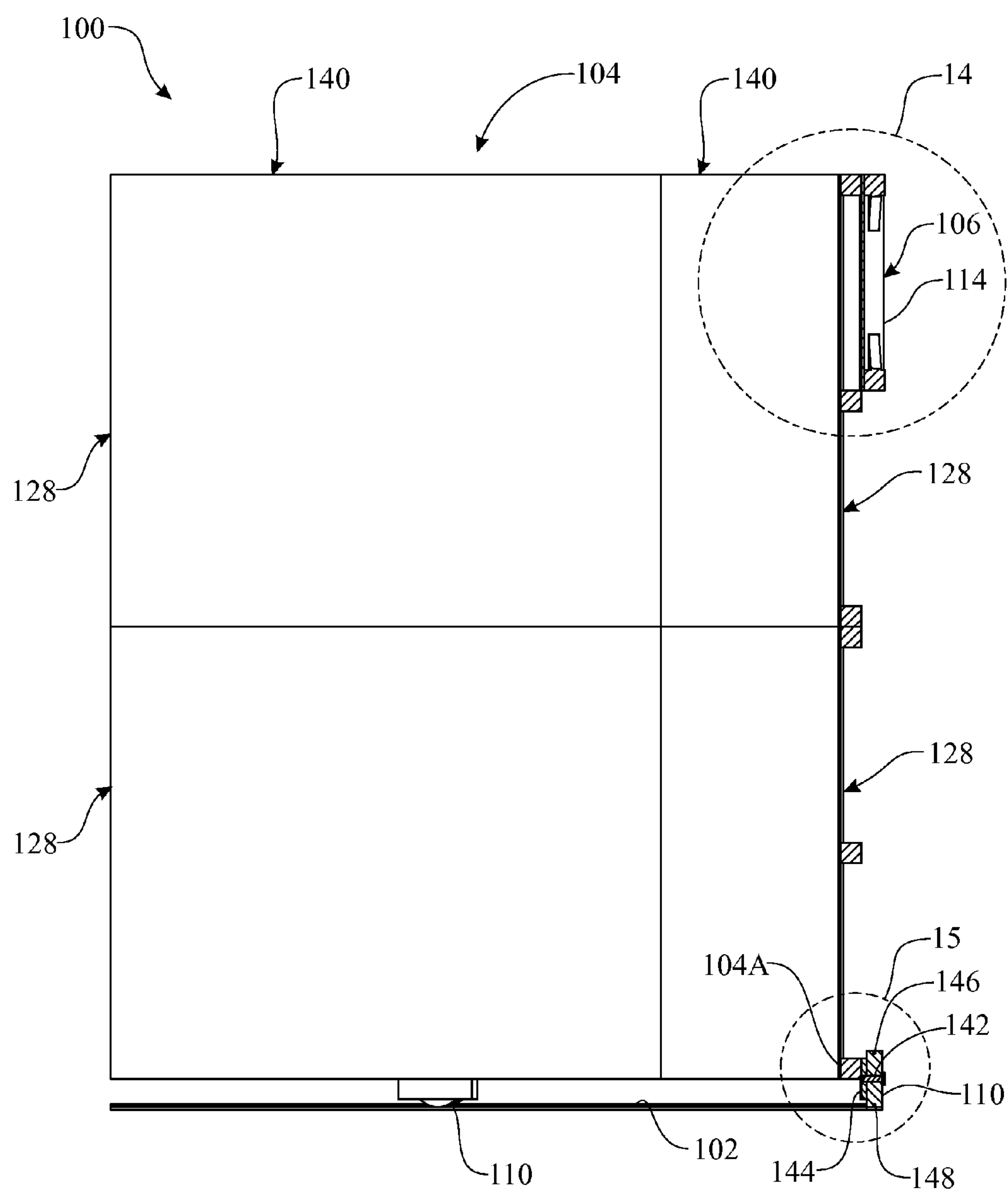
FIG. 13 presents an enlarged curved vertical section of a right half of the studio taken along line 13-13 of FIG. 1.
Figure 15:
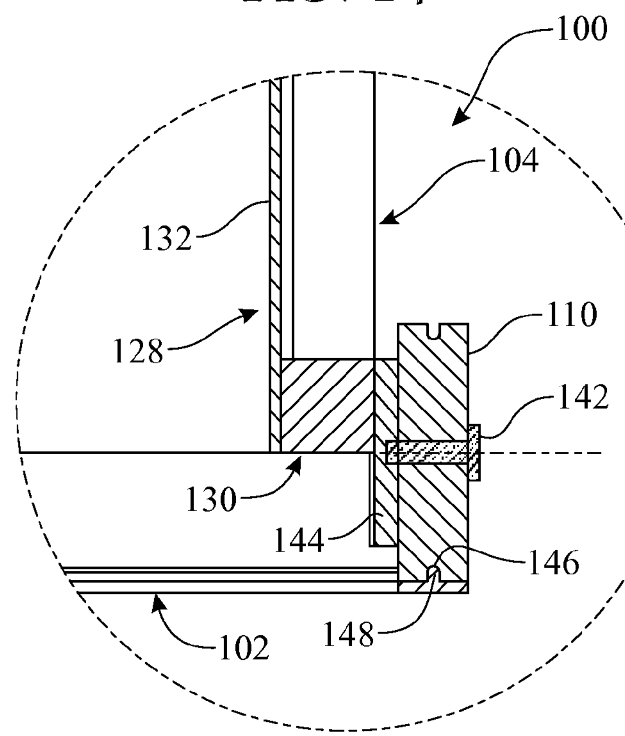
FIG. 15 presents an enlargement of a lower portion of the studio encompassed by a dashed circle 15 in FIG. 13.

The stationary track 102 and platform 108 each has a circular configuration. The platform 108 is surrounded by the track 102 and partially surrounded by the wall 104. At its outer peripheral edge portion 108A, the platform 108 underlies the upright wall 104, as best seen in FIGS. 13 and 15. The upright wall 104 has a curved configuration that preferably is greater than a semi-cylindrical configuration, but less than a full cylindrical configuration. By way of example but not limitation, the cylindrical configuration may be two-thirds of a full circle. Thus, the upright curved wall 104 only partially surrounds the platform 108. The wall 104 terminates at a pair of upright edge portions 104B, being spaced apart from each other so as to define a side opening 112 providing an entrance to the platform 108 and also an area or space for setup of equipment (not shown) for photographing a product (not shown) at the product setup location on the platform 108. The wall 104 supported by the rollers 110 is capable of being manually pushed along the track 102 an endless 360° circular path defined by the circular track 102 either in a clockwise direction or a counterclockwise direction. Thus, it can be readily understood that the upright curved wall 104 can be easily moved so as to relocate the wall 104 and the side opening 112 of the wall 104, and thus setup of photography equipment, at any selected angular position in relation to the product at the setup location on the platform 108.

The front overhead member 106 has a curved configuration similar to that of the wall 104 but preferably is closer to a semi-cylindrical configuration. The overhead curved member 106, being comprised of a pair of curved components 114 aligned end-to-end with one another, extends between and is mounted on the spaced apart upright edge portions 104B of the wall 104 at an upper end portion 104C of the wall 104 so as to augment the structural rigidly of the upright curved wall 104. By being mounted to the wall 104, the overhead curved member 106 will move with the wall 104 relative to the track 102.

By way of example but not of limitation, the upright curved wall 104 may be ten feet high, have a twelve foot radius, or be twenty-four feet wide, and closed over two feet at the top due to the presence of the overhead curved member 106. Furthermore, the top of the studio 100 may be completely closed by the provision of a reflective photographic cloth pulled tight to ensure no wrinkles, no hot spots or objects from above to reflect on the product, such as an automobile, positioned on the platform 108.

Figure 6:
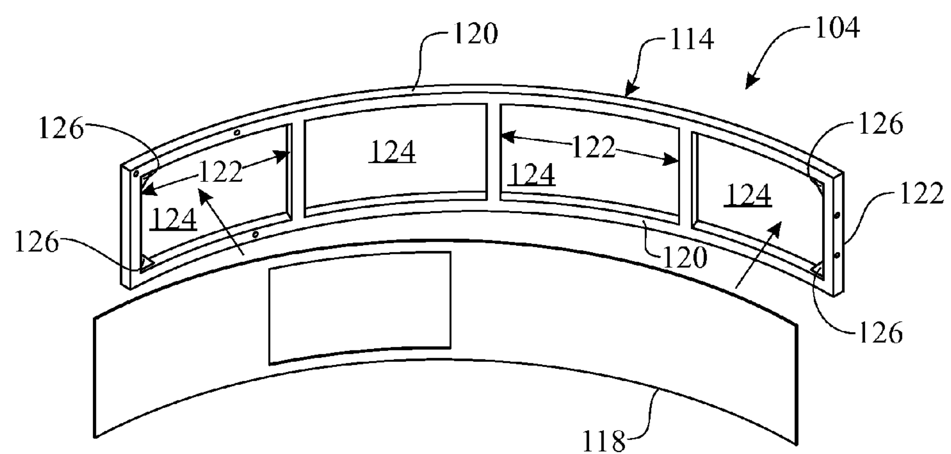
FIG. 6 presents an interior isometric view of one of a pair of curved components forming the front curved overhead member of FIG. 5, the one curved component including a curved frame and a curved cover sheet shown disassembled from one another.
Figure 7:
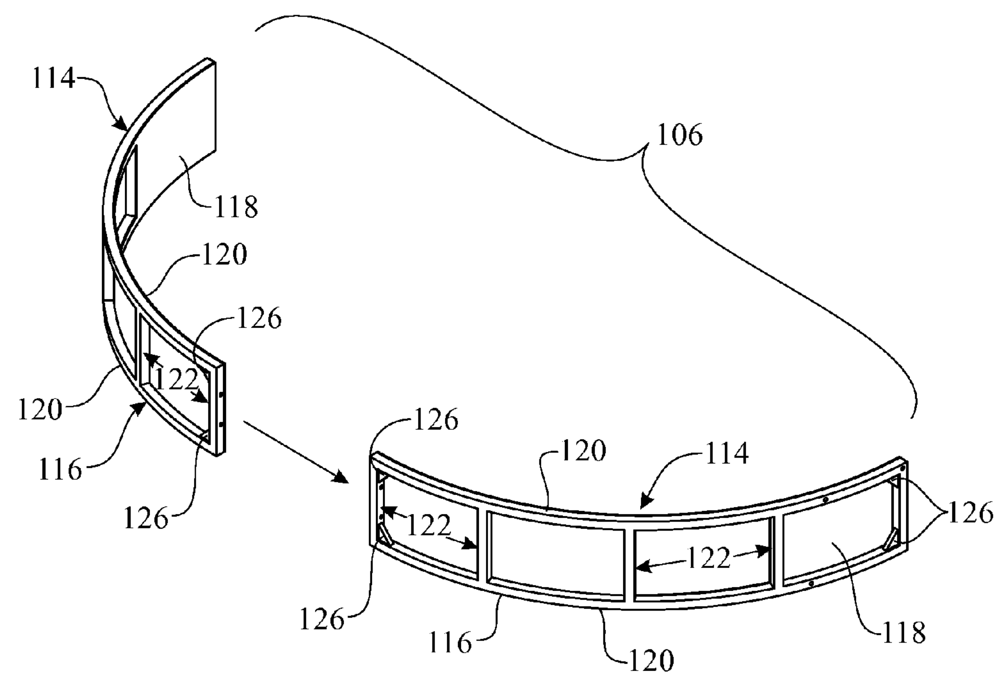
FIG. 7 presents a top front isometric view of the pair of curved components of the front curved overhead member being shown disassembled from one another.
Figure 8:
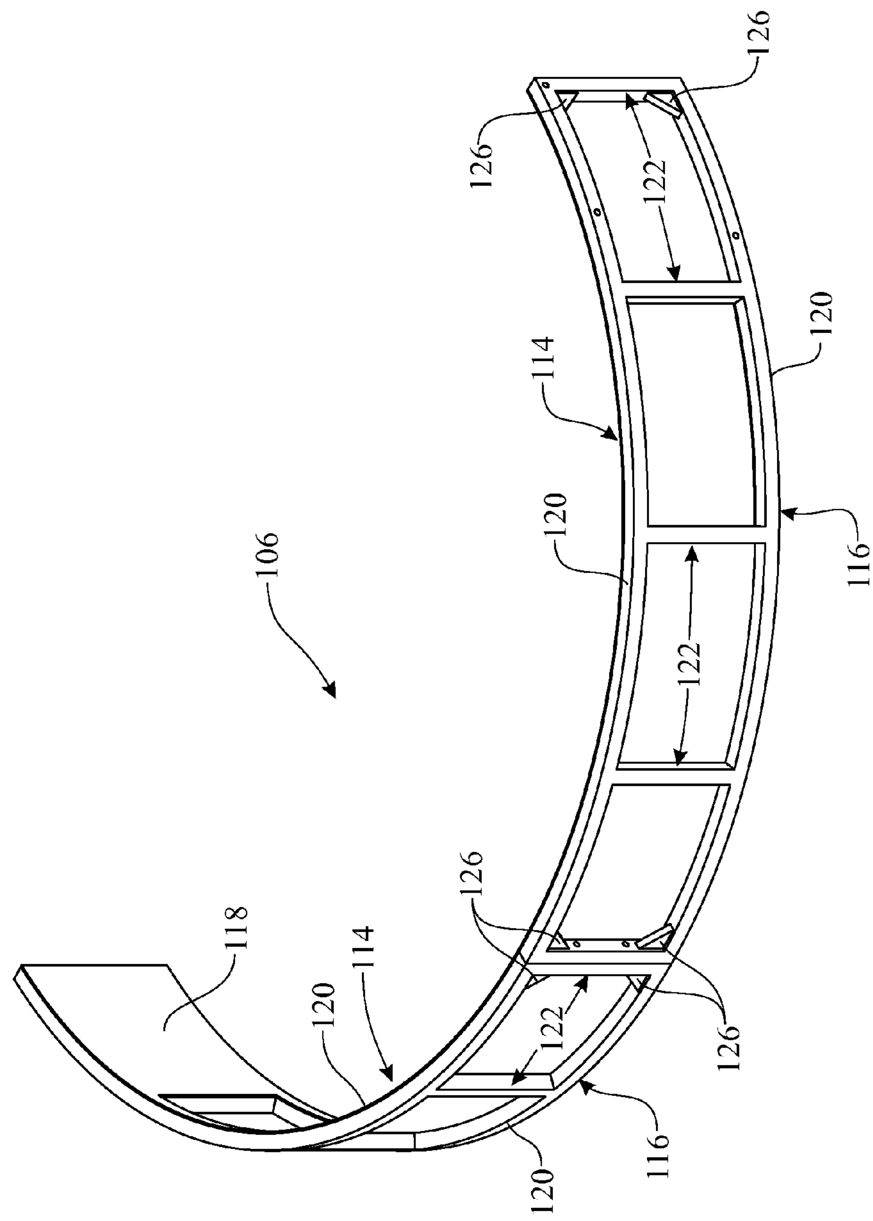
FIG. 8 presents a top front isometric view of the pair of curved components of the front curved overhead member assembled to one another.

Referring to FIGS. 6-8, it will be seen that each of the curved components 114 of the overhead curved member 106 is comprised of a curved frame 116 and a curved cover sheet 118 being of a length, width and curvature similar to that of the curved frame 116. The curved cover sheet 118 is disposed on an interior side of the curved frame 116 and assembled thereto by using any suitable conventional technique, such as, by way of example but not of limitation, fasteners, hooks, hook and loop patches, etc. The curved frame 116 may be made up of intersecting horizontal and vertical frame members 120, 122 that provide rectangular-shaped spaces 124 between them most of which being covered by the curved cover sheets 118. The curved frames 116 of the respective curved components 114 may be connected to one another using any suitable conventional technique, such as, by way of example but not of limitation, by using fasteners for connecting together end-to-end adjacent end ones of the vertical frame members 120 of the curved frames 116. Corner braces 126 may be incorporated by the curved frames 116 at the corners formed by the horizontal frame members 120 and the end ones of the vertical frame members 122.

Figures 9, 10:
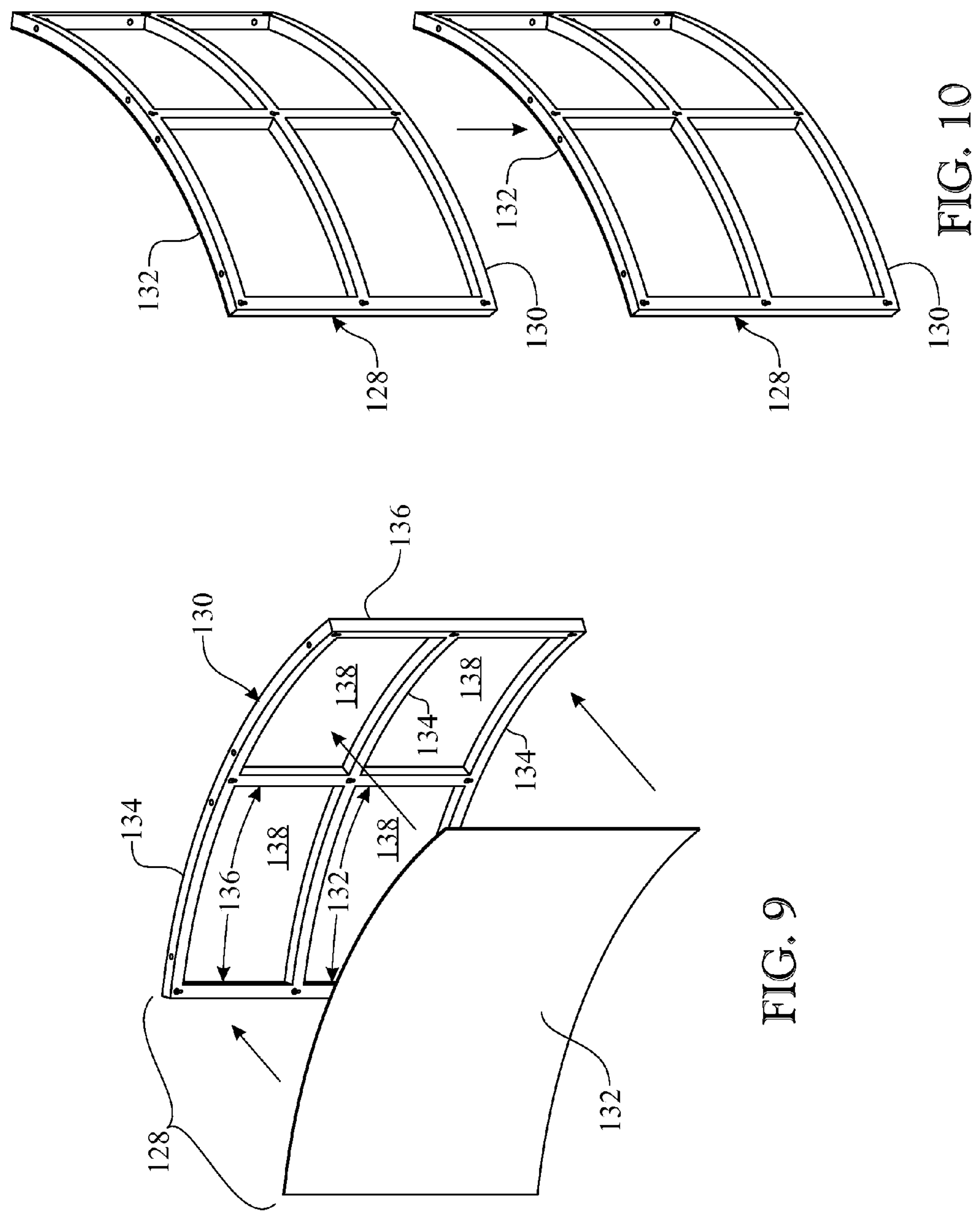
FIG. 9 presents a top interior isometric view of one of a plurality of curved lattice frames and one of a plurality of curved cover sheets that form one of a plurality of curved panels forming an upright curved wall of the studio, the curved lattice frame and curved sheet being shown disassembled from one another.
FIG. 10 presents a top exterior isometric view of a pair of curved panels that form one of a plurality of curved vertical sections of the upright curved wall of the studio, the curved panels being shown in a top-to-bottom alignment prior to being assembled to one another.
Figure 11:
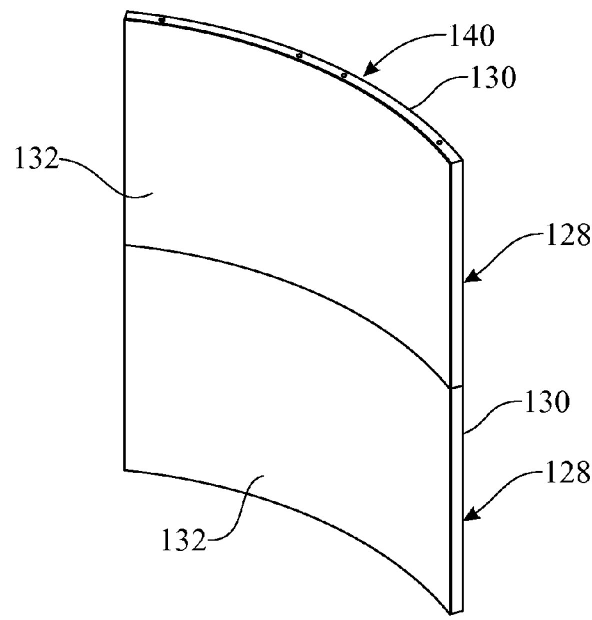
FIG. 11 presents a top interior isometric view of the pair of curved panels assembled together to form the one curved vertical section of the upright curved wall of the studio.
Figure 12:
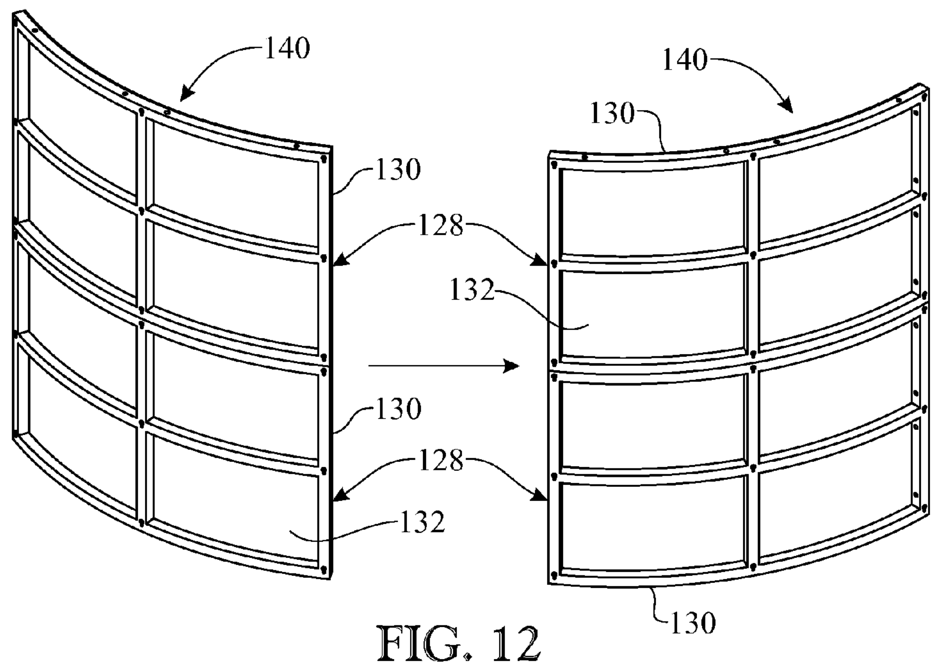
FIG. 12 presents a top exterior isometric view of a pair of the curved vertical sections of the upright curved wall of the studio, the curved vertical sections being shown in side-by-side alignment prior to being assembled to one another.

Turing now to FIGS. 9-12, there is illustrated the parts that are assembled together to construct the upright curved wall 104. As shown in FIGS. 1-5, the wall 104 is constructed of a plurality of curved panels 128. More particularly, as seen in FIG. 9, each curved panel 128 includes a curved lattice frame 130 and a curved cover sheet 132 being of a length, width and curvature similar to that of the curved lattice frame 130. The curved cover sheet 132 is disposed on an interior side of the curved lattice frame 130 and assembled thereto using any suitable conventional technique, such as, by way of example but not of limitation, by using fasteners, hooks, hook-and-loop patches, etc. The curved lattice frame 130 has a lattice type construction being made up of intersecting horizontal and vertical frame members 134, 136 that leaves rectangular-shaped spaces 138 between them that are covered by the curved cover sheet 132. As seen in FIGS. 10 and 11, the wall 104 may be viewed as being formed by a plurality of vertical sections 140 each in turn formed by a pair of the curved panels 128. Each pair of the curved panels 128 are assembled to one another in a top-to-bottom alignment with one another. As seen in FIG. 12, the vertical sections 140, being by way of example and not of limitation, four in number, are assembled to one another in a side-by-side alignment with one another.

Figure 14:
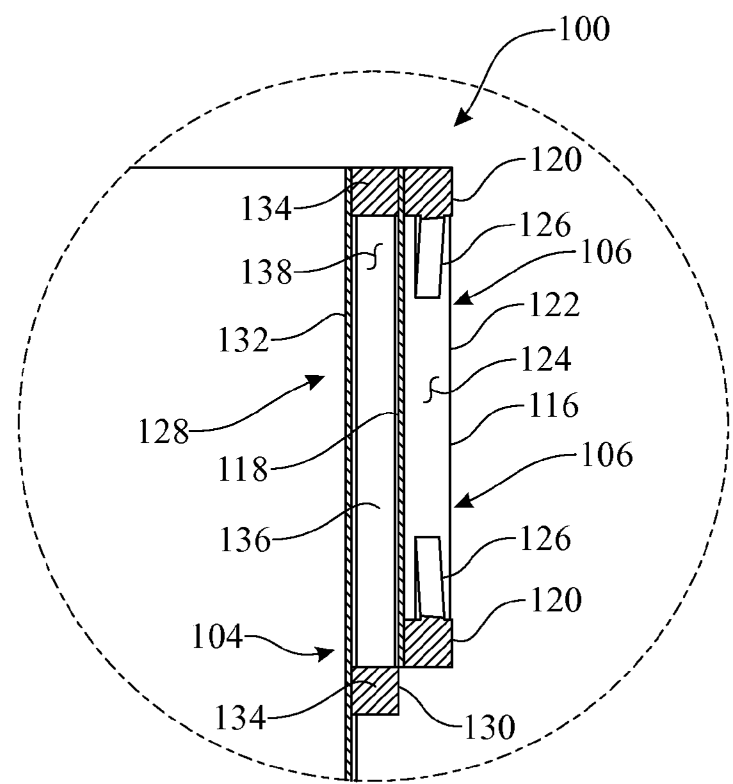
FIG. 14 presents an enlargement of an upper portion of the studio encompassed by a dashed circle 14 in FIG. 13.

As shown in FIGS. 13 and 14 by way of example but not of limitation, each of the curved components 114 of the overhead curved member 106 may be substantially shorter in height than each of the curved lattice frames 130 of each of the curved panels 128 of the wall 104. Also, by way of example but not of limitation, the horizontal and vertical frame members 120, 122 of the curved components 114 of the overhead curved member 106 and the horizontal and vertical frame members 134, 136 of each of the curved lattice frames 130 of the respective curved panels 128 of the wall 104 may be made of hollow or solid one and one-half inch square metal tubing, such as of aluminum or steel. Further, by way of example but not of limitation, the curved components 114 of the overhead curved member 106 may be connected to one another and the curved panels 128 of the wall 104 may be connected to one another, such as by using fasteners in the form of three-eighths inch screws and bolts.

Referring now to FIGS. 1-5, 13 and 15, each of the plurality of rollers 110 is rotatably mounted on the lower end portion 104A of one of the vertical sections 140 of the wall 104. Thus, in the exemplary embodiment there are four rollers 110 corresponding to the four vertical sections 140. Each roller 110 is rotatably mounted by an axle 142 fixed to and extending radially outward from a bracket 144 attached to the lower one of the horizontal frame members 134 of the lower one of the curved lattice frames 130 of the respective lower one of the curved panels 128 of the respective vertical section 140 of the wall 104. The roller 110 has an endless channel or groove 146 formed circumferentially about its periphery that is receives and thus is engaged with a raised rib 148 of the track 102. In such manner, the rollers 110 mount the wall 104 upon the track 102 for undergoing revolvable movement along the track 102 and about the platform 108.

In addition to the foregoing features, the studio 100 may have suitable lighting, such as LED lights of highest color photograph quality, mounted thereabout, such as on the upright curved wall 104 and/or the front curved overhead member 106. The studio backdrop sheets may be constructed of rigid polyvinyl chloride (PVC) plastic material. The curved wall 104 of the studio 100, incorporating the aforementioned design and construction, acts as a revolvable (e.g., slidable or rollable) backdrop capable of producing high quality photographic images, while saving a substantial amount of time by eliminating the need to continuously move a product to be photographed, such as an automobile. An automobile may be driven onto the platform 108 and left at a single central position thereon. The curved wall 104 is simply manually moved along the track 104 to take photos from different angles (e.g. front, side, back, front angle, etc.). In this way, there is always a clean background no matter what angle a photo of the automobile is taken from. The studio 100 allows for small micro adjustments of the photo angle. And also allows adjustments depending upon outside lighting. One does not have to constantly move the automobile to different angles on the platform 108.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A photography studio, comprising:

a stationary circular track surrounding a product setup location;

an upright wall defining a studio backdrop, being of a curved configuration, at least partially surrounding the product setup location, and being mounted at a lower end portion of said wall by said track for undergoing revolvable movement along said track and about the product setup location, said wall having a pair of upright edge portions being spaced apart so as to define a side opening in said wall providing an entrance to the product setup location; and a front overhead member, being of a curved configuration similar to that of said wall and extending between and mounted on said spaced apart upright edge portions of said wall at an upper end portion of said wall, for undergoing the revolvable movement with said wall.

2. The studio of claim 1 wherein said upright wall also has a plurality of rollers being spaced apart from one another and rotatably mounted on said lower end portion of said wall and engaged with said track so as to mount said wall upon said track for undergoing said revolvable movement along said track and about the product setup location to relocate said wall and said side opening of said wall at any selected angular position in relation to the product setup location.

3. The studio of claim 1 further comprising a stationary circular platform providing the product setup location.

4. The studio of claim 1 wherein said upright curved wall comprises a plurality of curved vertical sections in a side-by-side alignment with one another.

5. The studio of claim 4 wherein each of said curved vertical sections of said upright curved wall comprises a pair of curved panels in a top-to-bottom alignment with one another.

6. The studio of claim 5 wherein each of said curved panels comprises a curved lattice frame and a curved cover sheet assembled thereto.

7. The studio of claim 1 wherein said front curved overhead member comprises a pair of curved components aligned end-to-end with one another.

8. The studio of claim 7 wherein each of said curved components of said front curved overhead member comprises a curved frame and a curved cover sheet disposed on an interior side of and being assembled to said curved frame.

9. A photography studio, comprising:

a stationary circular platform providing a product setup location;

a stationary circular track surrounding said platform; and an upright wall defining a studio backdrop, being of a curved configuration, and at least partially surrounding said platform, said wall having a pair of upright edge portions being spaced apart so as to define a side opening in said wall providing an entrance to said platform;

wherein said upright wall also has a plurality of rollers being spaced apart from one another and rotatably mounted on a lower end portion of said wall and engaged with said track so as to mount said wall upon said track for undergoing revolvable movement along said track and about said platform to relocate said wall and thus said side opening in said wall at any selected angular position in relation to the platform; and a front overhead member being of a curved configuration similar to that of said upright curved wall and extending between and mounted on a pair of spaced apart upright edge portions of said wall at an upper end portion of said wall for undergoing said revolvable movement with said wall.

10. The studio of claim 9 wherein said upright curved wall comprises a plurality of curved vertical sections in a side-by-side alignment with one another.

11. The studio of claim 10 wherein each of said vertical sections of said upright curved wall comprises a pair of curved panels in a top-to-bottom alignment with one another.

12. The studio of claim 11 wherein each of said curved panels comprises a curved lattice frame and a curved cover sheet disposed on an interior side of and being assembled to said curved lattice frame.

13. The studio of claim 9 wherein said front curved overhead member comprises a pair of curved components aligned end-to-end with one another.

14. The studio of claim 13 wherein each of said curved components of said front curved overhead member comprises a curved frame and a curved cover sheet disposed on an interior side of and being assembled to said curved frame.

15. A photography studio, comprising:

a stationary circular track surrounding a product setup location; and an upright wall defining a studio backdrop and providing a side opening for setup of equipment for photographing a product at the product setup location, said wall being of a curved configuration, at least partially surrounding the product setup location, and mounted at a lower end portion of said wall by said track for undergoing revolvable movement along said track and about the product setup location;

wherein said upright curved wall comprises a plurality of curved panels assembled to one another side-to-side and top-to-bottom so as to provide said studio backdrop, each of said curved panels being comprised of a curved lattice frame, and a curved cover sheet disposed on an interior side of and being assembled to said curved lattice frame; and a front overhead member being of a curved configuration similar to that of said upright curved wall and extending between and mounted on a pair of spaced apart upright edge portions of said wall at an upper end portion of said wall for undergoing said revolvable movement with said wall.

16. The studio of claim 15 wherein said pair of spaced apart upright edge portions of said wall defines said opening of said upright curved wall for setup of equipment for photographing a product at the product setup location.

17. The studio of claim 15 further comprising a stationary circular platform providing the product setup location.

18. The studio of claim 15 wherein said upright wall also has a plurality of rollers being spaced apart from one another and rotatably mounted on said lower end portion of said wall and engaged with said track so as to mount said wall upon said track for undergoing said revolvable movement along said track and about the product setup location to relocate said wall and said side opening of said wall at any selected angular position in relation to the product setup location.

* * * * *